United States Patent
Ito

(10) Patent No.: US 10,365,924 B2
(45) Date of Patent: Jul. 30, 2019

(54) ELECTRONIC DEVICE

(71) Applicant: Onkyo Corporation, Osaka (JP)

(72) Inventor: Kazunari Ito, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 16/058,705

(22) Filed: Aug. 8, 2018

(65) Prior Publication Data

US 2019/0065175 A1    Feb. 28, 2019

(30) Foreign Application Priority Data

Aug. 29, 2017   (JP) ................................ 2017-164390

(51) Int. Cl.
*G06F 8/654* (2018.01)
*G06F 8/65* (2018.01)
*G06F 11/14* (2006.01)

(52) U.S. Cl.
CPC ............ *G06F 8/654* (2018.02); *G06F 11/142* (2013.01); *G06F 8/65* (2013.01); *G06F 2201/805* (2013.01)

(58) Field of Classification Search
CPC ....................................................... G06F 8/65
USPC ........................................................ 717/168
See application file for complete search history.

(56) References Cited

U.S. PATENT DOCUMENTS

| | | | | |
|---|---|---|---|---|
| 5,694,538 A * | 12/1997 | Okazaki | ............. | G06F 11/1433 714/15 |
| 6,253,281 B1 * | 6/2001 | Hall | .................... | G06F 11/1433 711/103 |
| 2004/0068548 A1 * | 4/2004 | Sugita | ...................... | G06F 8/65 709/208 |
| 2005/0015582 A1 * | 1/2005 | Shida | ........................ | G06F 8/65 713/2 |
| 2007/0050533 A1 * | 3/2007 | Suzuki | .................. | G06F 9/4403 711/102 |
| 2011/0145807 A1 * | 6/2011 | Molinie | ................... | G06F 8/65 717/170 |
| 2017/0039372 A1 * | 2/2017 | Koval | .................... | G01D 4/004 |
| 2017/0220404 A1 * | 8/2017 | Polar Seminario | ..... | G06F 8/654 |
| 2018/0367378 A1 * | 12/2018 | Sugioka | ................ | H04L 41/082 |

FOREIGN PATENT DOCUMENTS

JP      2016-103261 A    6/2016

* cited by examiner

*Primary Examiner* — Qing Chen
*Assistant Examiner* — Clint Thatcher
(74) *Attorney, Agent, or Firm* — Renner, Otto, Boisselle & Sklar, LLP

(57) ABSTRACT

An electronic device includes a volatile memory; a non-volatile memory which is for storing firmware; and a circuit, wherein the firmware includes firmware body and loader which is for rewriting the non-volatile memory, and the circuit, judges whether the firmware is being rewritten or not based on a first mark when activating, judges whether the loader is being rewritten or not based on a second mark when it judges that the firmware is being rewritten, copies the loader which is copied to the other position of the non-volatile memory to the volatile memory when it judges that the loader is being rewritten, and executes the loader which is copied to the volatile memory and rewrites the firmware which is stored in the non-volatile memory.

6 Claims, 14 Drawing Sheets

Fig. 13

| ADDRESS (OFFSET) | CONTENTS |
|---|---|
| +0x00000000 | LOADER VECTOR (ON RAM) |
| +0x00000004 | LAST ADDRESS OF LOADER |
| +0x00000008 | STACK POINTER OF LOADER |
| +0x0000000C | OPTION DATA (SPARE) |
| AFTER +0x00000010 | LOADER BODY |

… 
ELECTRONIC DEVICE

CROSS-REFERENCE TO RELATED APPLICATIONS

This application claims priority to Japanese Application No. 2017-164390, filed Aug. 29, 2017, the entire contents of which are incorporated herein by reference.

FIELD

The present invention relates to an electronic device which includes firmware.

BACKGROUND

Each of many embedded system microcomputers has a built in flash ROM (flash memory) and a RAM. Programs are stored in the built in flash ROM. A CPU reads instruction codes from the flash ROM and performs them. Capacity of the RAM is smaller than the flash ROM and the CPU cannot copy (download) all of the programs on the RAM and perform them. When function which rewrites a program on the flash ROM to a new version program is provided, it is necessary that a program for rewriting is also stored on the flash ROM. In the flash ROM, programs which perform functions as an original product and a program (flash loader. Hereinafter, referred as to "loader".) to rewrite the flash ROM are stored as the so-called firmware.

When the firmware is updated to new version firmware, the firmware is imported by method such as serial communication from outside of the microcomputer and it is written in the flash ROM. The flash ROM cannot be rewritten by the loader which is written on the flash ROM (since the loader is rewritten in middle of execution). Typically, the loader in the firmware is copied on the RAM and the instruction codes are read from the RAM and executed (for example, see JP 2016-103261 A). As described above, capacity of the built in RAM is small and capacity that the loader can be copied is required. However, it is difficult to secure the further RAM for work. Therefore, in serial communication, the firmware is input from small address of the flash ROM in order, and is written to the flash ROM in this order.

When the flash ROM is being rewritten, rewriting is interrupted by power supply cut or any abnormality, incomplete, namely, abnormal program is written in the flash ROM, and a device becomes inoperable. To prevent this, when the flash ROM is being rewritten, a mark which indicates rewriting is marked in somewhere of the flash ROM (or, a mark is marked by intentionally setting a part of the flash ROM to delete state). And, when activating a microcomputer, the microcomputer confirms the mark which indicates rewriting, judges that rewriting is interrupted when being rewritten if there is the mark, copies the loader to the RAM, executes, and performs rewriting of the firmware again. Thus, the device returns (recovery activation).

However, when the loader of the flash ROM is being rewritten, rewriting is interrupted by power supply cut or the like and the loader is broke state. For this reason, the firmware cannot be rewritten again and the device cannot return. To prevent this, there is a method that one is always normal by setting the flash ROM to twice capacity and rewriting the firmware alternately. It is necessary that capacity of the flash ROM is twice in this case. Further, as illustrated in FIG. 14, a microcomputer which has function which replaces small capacity block that the loader enters to the other block and can always store any one of new loader or old loader exists. However, all of the microcomputers do not have the above described function. There is a case where the loader is not stored because the replaced block is small capacity.

In a conventional device, when rewriting is interrupted when the loader is being rewritten, there is a possibility that the firmware cannot be recovered.

SUMMARY OF THE INVENTION

According to one aspect of the disclosure, there is provided an electronic device comprising: a volatile memory; a non-volatile memory which is for storing firmware; and a circuit, wherein the firmware includes firmware body and loader which is for rewriting the non-volatile memory, and the circuit provides a first mark which indicates that the firmware is being rewritten on the non-volatile memory, provides a second mark which indicates that the loader is being rewritten on the non-volatile memory, judges whether the firmware is being rewritten or not based on the first mark when activating, copies the loader which is stored in the non-volatile memory to the volatile memory when it judges that the firmware is not being rewritten, copies the loader which is stored in the non-volatile memory to the other position of the non-volatile memory, judges whether the loader is being rewritten or not based on the second mark when it judges that the firmware is being rewritten, copies the loader which is copied to the other position of the non-volatile memory to the volatile memory when it judges that the loader is being rewritten, and executes the loader which is copied to the volatile memory and rewrites the firmware which is stored in the non-volatile memory.

BRIEF DESCRIPTION OF THE DRAWINGS

FIG. 13 is a diagram illustrating loader and vector located at head of the loader.

DETAILED DESCRIPTION OF THE PREFERRED EMBODIMENTS

An objective of the present invention is to be able to recover firmware even if rewriting is interrupted when loader is being rewritten.

Figure 1:
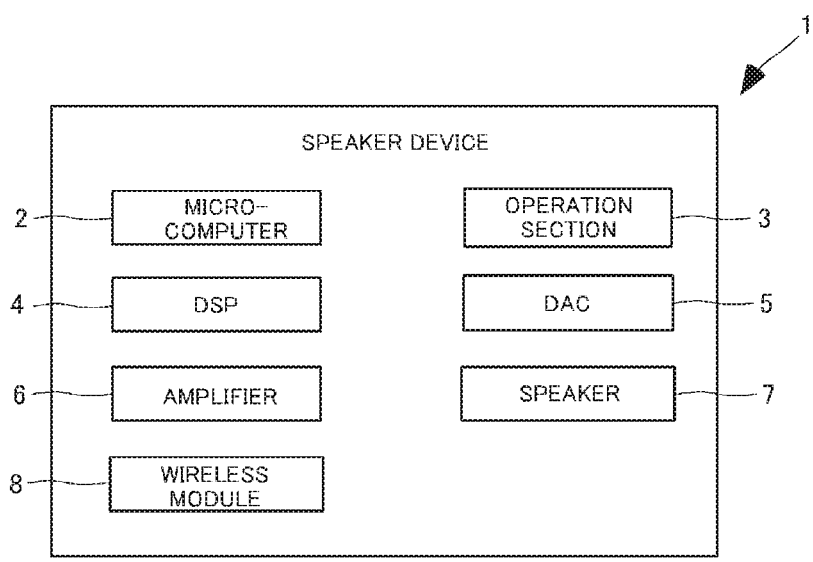
FIG. 1 is a block diagram illustrating a constitution of a speaker device according to an embodiment of the present invention.
Figure 2:
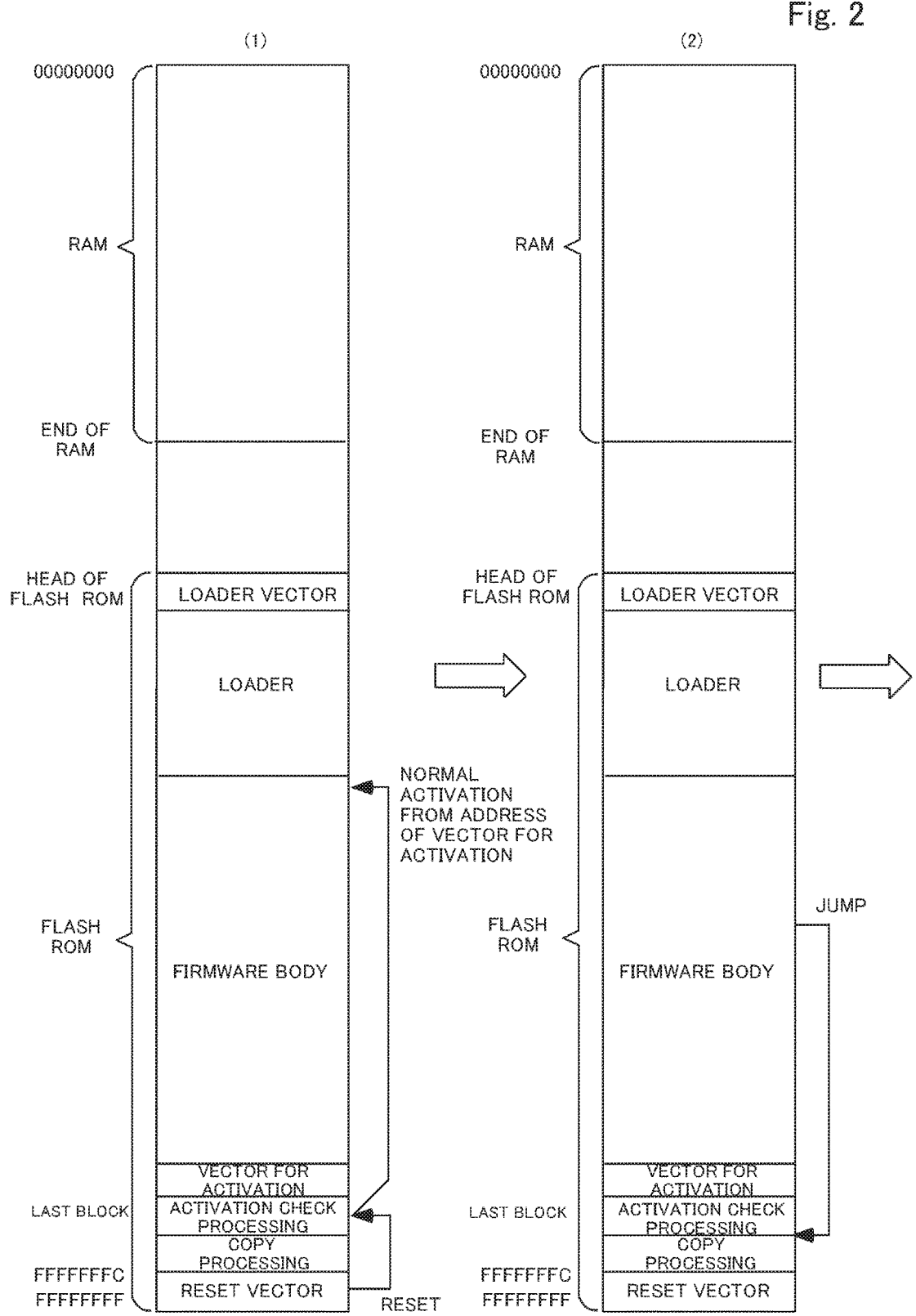
FIG. 2 is a diagram illustrating sequence from normal activation to normal firmware update.
Figure 3:
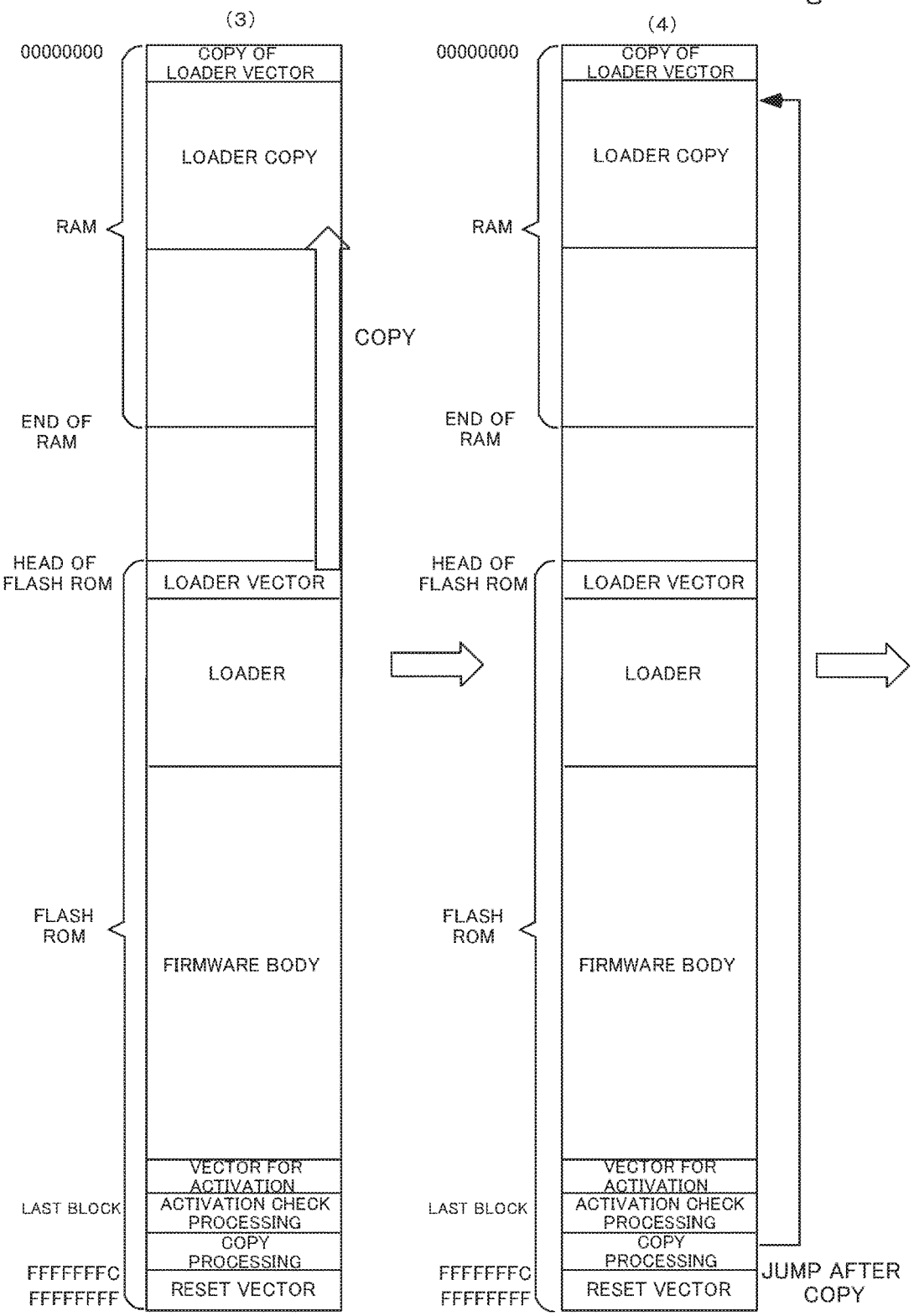
FIG. 3 is a diagram illustrating sequence from normal activation to normal firmware update.
Figure 4:
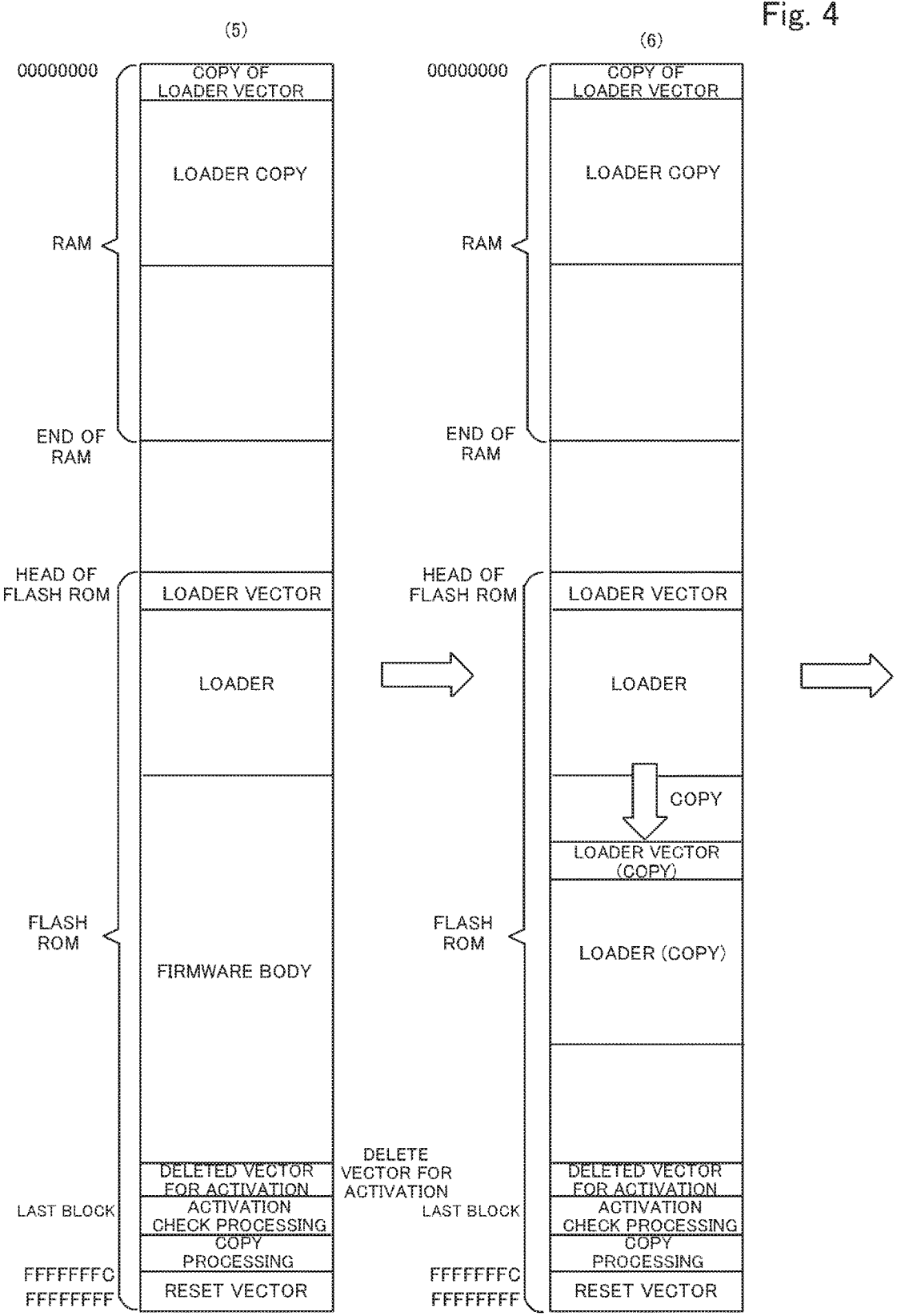
FIG. 4 is a diagram illustrating sequence from normal activation to normal firmware update.
Figure 5:
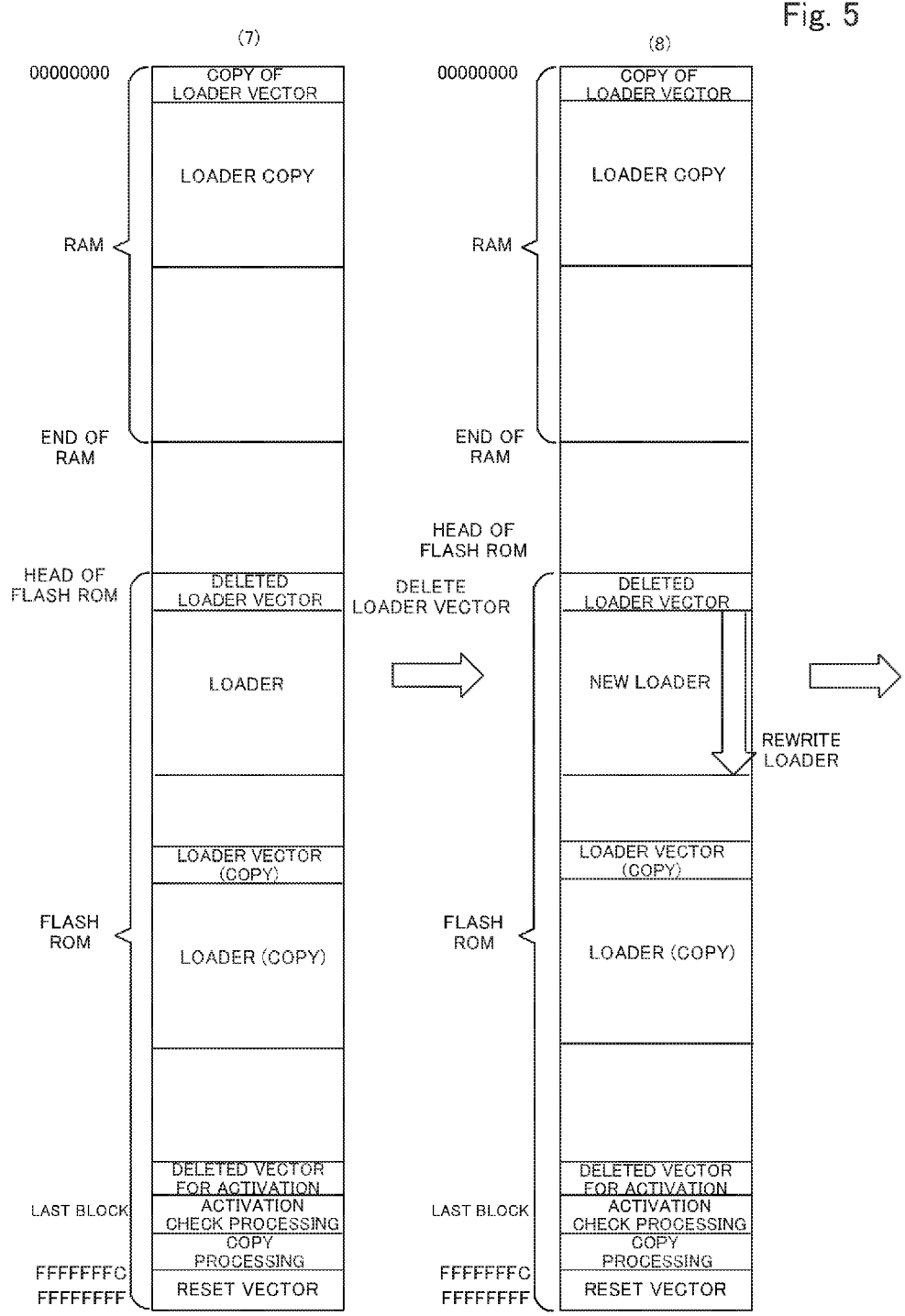
FIG. 5 is a diagram illustrating sequence from normal activation to normal firmware update.
Figure 6:
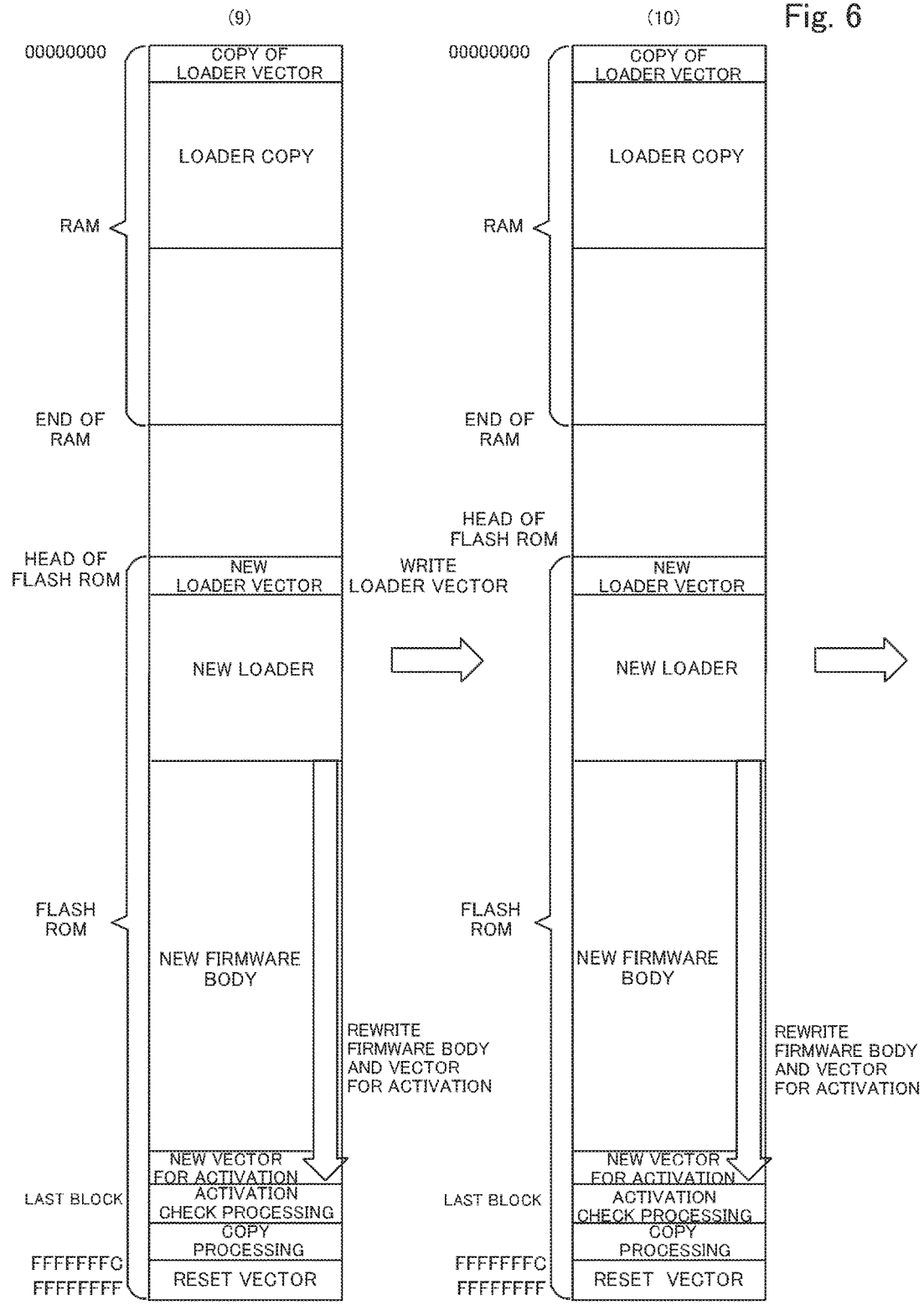
FIG. 6 is a diagram illustrating sequence from normal activation to normal firmware update.
Figure 7:
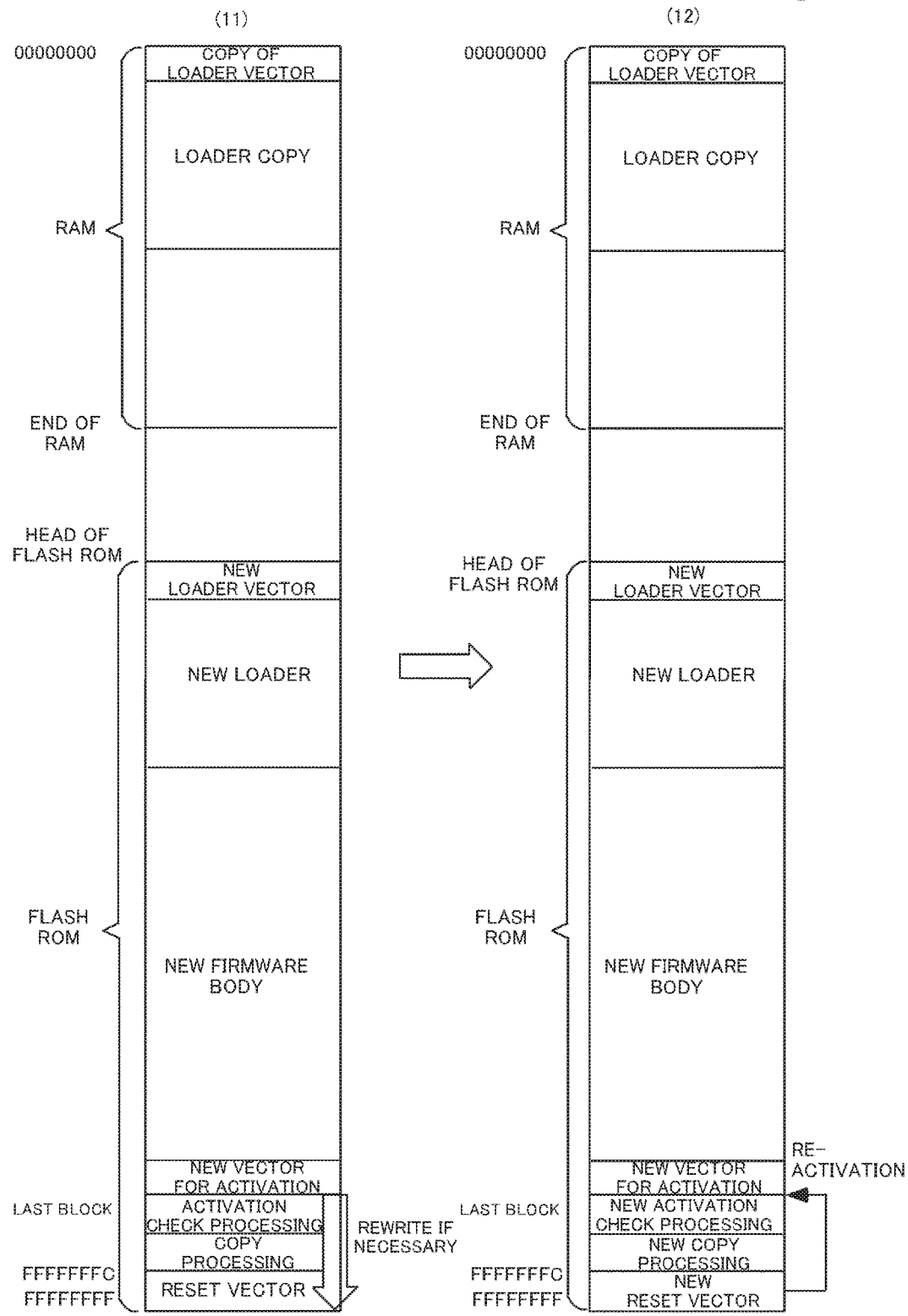
FIG. 7 is a diagram illustrating sequence from normal activation to normal firmware update.

An embodiment of the present invention is described below. FIG. 1 is a block diagram of a constitution of a speaker device according to an embodiment of the present invention. The speaker device 1 (electronic device) includes a microcomputer 2, an operation section 3, a DSP (Digital Signal Processor) 4, a D/A convertor (Hereinafter, referred as to "DAC") 5, an amplifier 6, a speaker 7, and a wireless module 8.

The microcomputer 2 includes a CPU (circuit, controller), a flash memory (non-volatile memory), a RAM (volatile memory) and so on. The microcomputer 2 controls respective sections composing the speaker device 1. The operation section 3 has a volume knob which is for receiving volume adjustment by a user, for example. The DSP 4 performs signal processing to a digital audio signal. The DAC 5 D/A-converts the digital audio signal to which the DSP 4 performs the signal processing to an analog audio signal. The amplifier 6 amplifies the analog audio signal to which the DAC 5 D/A-converts. The analog audio signal that the amplifier 6 amplifies is output to the speaker 7. The speaker 7 outputs an audio based on the analog audio signal to be input. The wireless module 8 is for performing wireless communication according to Bluetooth (registered trademark) standard and Wi-Fi standard.

The microcomputer 2 receives the digital audio signal which is sent from a smart phone, a digital audio player or the like via the wireless module 8, for example. And, the microcomputer 2 performs the signal processing by the DSP 4, D/A converting by the DAC 5, and amplification of the analog audio signal by the amplifier 6 to the received digital audio signal.

Firmware is stored in the flash ROM. The firmware includes firmware body and loader to rewrite the flash ROM. Processing in case where the firmware is updated is described below.

(Sequence from Normal Activation to Normal Firmware Update (FIG. 2 to FIG. 7))

(1) When the microcomputer 2 is reset, the CPU reads reset vector and jumps to its address. Herein, the reset vector indicates activation check processing and the CPU jumps to the activation check processing. In the activation check processing, the CPU checks vector for activation. When the vector for activation is not deleted, the CPU jumps to address of normal operation program which is indicated by the vector for activation (normal activation). In the flash ROM, bit of address which is deleted becomes all 1 (one). For this reason, the CPU can judge whether the vector for activation is deleted or not depending on whether bit of vector is all 1 (one) or not.

(2) When update is instructed by user operation or the like, the CPU jumps to copy processing. (3) When the CPU can judge that loader vector is not deleted, it copies the loader vector and the loader to the RAM. The loader vector and the loader are compiled to be able to execute with address on copy destination RAM. (4) Next, the CPU jumps to address of the loader which is indicated by the loader vector (the loader vector may be on the flash ROM before copy or after copy) (The loader vector is compiled to indicate address on the RAM.). The CPU sets flag A←0 and flag B←0 as parameter. Flag A=0 indicates that the vector for activation is not deleted. Flag B=0 indicates that the loader vector is not deleted.

(5) When flag A is 0, the CPU deletes the vector for activation. When rewriting is interrupted and the microcomputer reactivates while the vector for activation is deleted, normal activation is not performed in judgement (1). (6) When flag B is 0, the CPU copies the original loader (which exists on head of the flash ROM) to fixed address. The fixed address may be any address which does not overlap the original loader. Further, the fixed address may overlap address of the firmware body and the firmware body may be overwritten. It is not necessary that capacity of the flash ROM for copy is secured by coping to overwrite the original loader to the firmware body.

(7) When flag B is 0, the CPU deletes the original loader vector on the flash ROM. When rewriting is interrupted and the microcomputer reactivates while the loader vector is deleted, copy of the loader to the fixed address is not performed in (6). (8) The CPU obtains the firmware by serial communication or the like and rewrites the firmware. The firmware is passed from small address in order. The loader is provided in head of the firmware, and the CPU rewrites the loader first. Value of the loader vector is copied on the RAM, and it is not rewritten here (it remains deleted.).

(9) When the CPU rewrites new loader, it writes the copied loader vector. In judging whether rewriting the loader is ended or not, the CPU records last address (=size) of the loader to next address of the loader vector, writes the address, and judges end of rewriting the loader. (10) The CPU rewrites the remaining firmware up to the vector for activation.

(11) The CPU compares new firmware with old activation check processing, copy processing, and reset vector which are on the flash ROM. These processing and the vector are small and simple, and in most of cases, they are not changed and do not need to be rewritten. However, the microcomputer 2 is reset when rewriting, and activation cannot be done. The CPU compares new firmware with old activation check processing, copy processing, and reset vector, they are the same, and the CPU does not rewrite. Thus, risk that activation cannot be done is eliminated. When they are changed, the CPU rewrites. (12) The CPU resets the microcomputer 2, reactivates, and jumps to address of the reset vector. And, the CPU returns to processing of (1).

Figure 8:
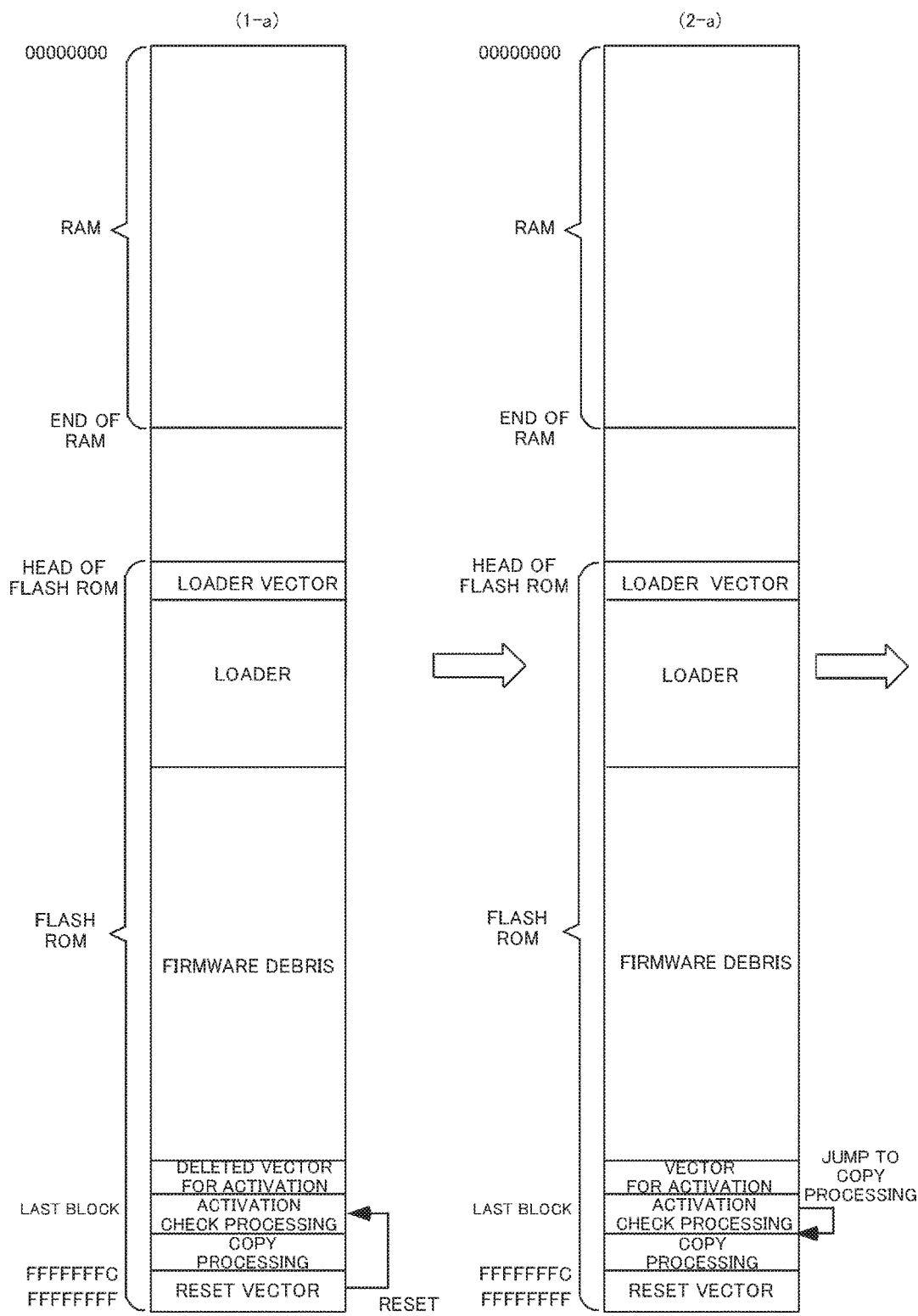
FIG. 8 is a diagram illustrating sequence of recovery firmware update.
Figure 9:
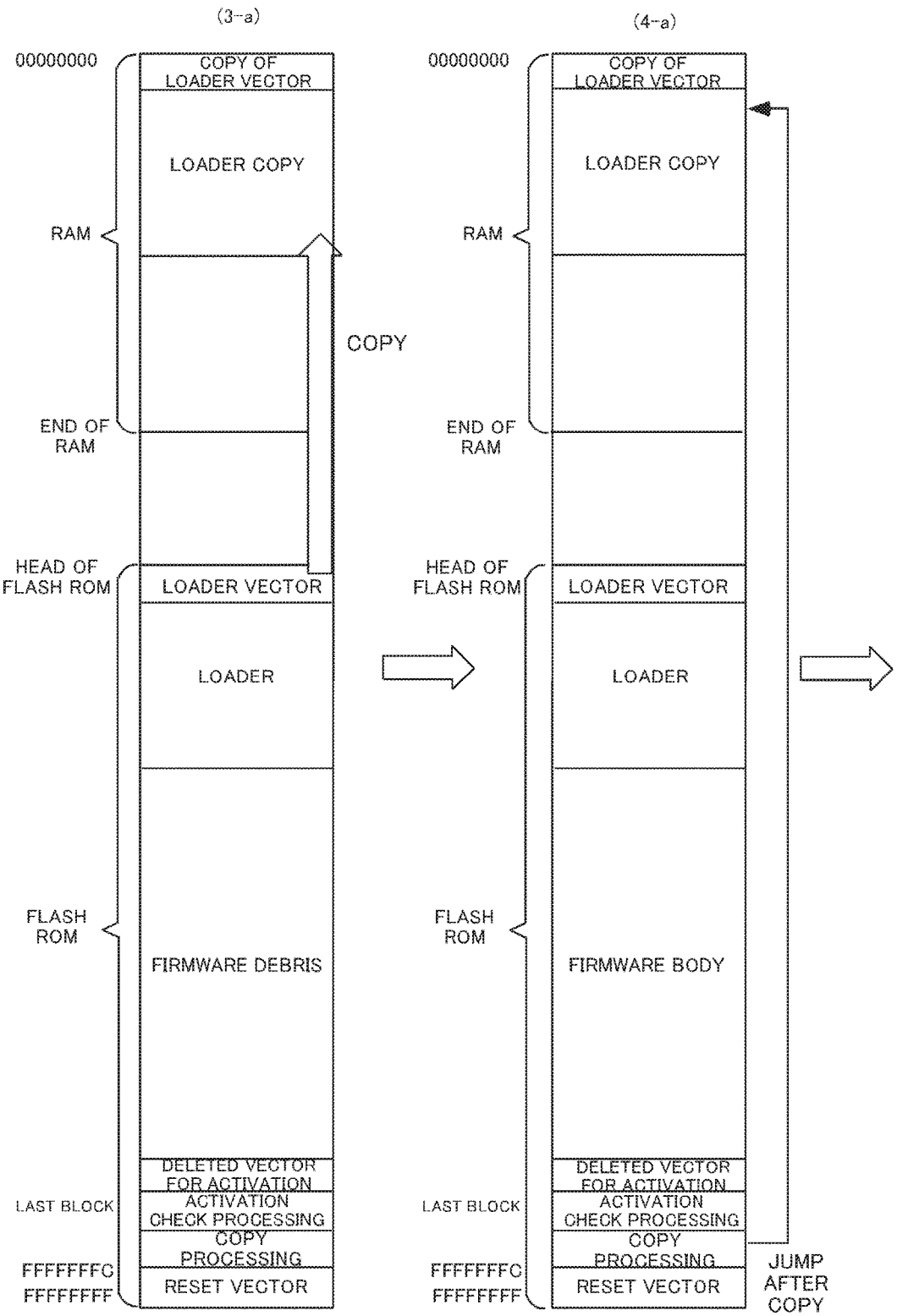
FIG. 9 is a diagram illustrating sequence of recovery firmware update.

(Sequence a of Recovery Firmware Update (FIG. 8 and FIG. 9))

(1-a) When the microcomputer 2 is reset, the CPU reads the reset vector, the reset vector indicates the activation check processing, and the CPU jumps to the activation check processing. (2-a) The CPU checks the vector for activation, the vector for activation is deleted, and the CPU jumps to copy processing. (3-a) The CPU confirms that the loader vector is not deleted, the loader vector is not deleted, and the CPU copies the loader vector and loader which are on original address to the RAM. The CPU jumps to address of the loader which is indicated by the loader vector (the loader vector may be on the flash ROM before copy or after copy) (The loader vector is compiled to indicate address on the RAM.). At this time, the CPU sets flag A←1 and flag B←0 as parameter. Flag A=1 indicates that the vector for activation is deleted. Flag B=0 indicates that the loader vector is not deleted. After this, the CPU performs processings of (6) to (12).

Herein, delete of the vector for activation corresponds to a mark (first mark) which indicates that the firmware is being rewritten. The CPU provides the mark on the flash ROM by deleting the vector for activation. When the vector for activation is not deleted, the CPU judges that the firmware is not being rewritten, namely, rewriting is not interrupted when the firmware is being rewritten. When the vector for activation is deleted, CPU judges the firmware is being rewritten, namely, rewriting is interrupted when the firmware is being rewritten.

Figure 10:
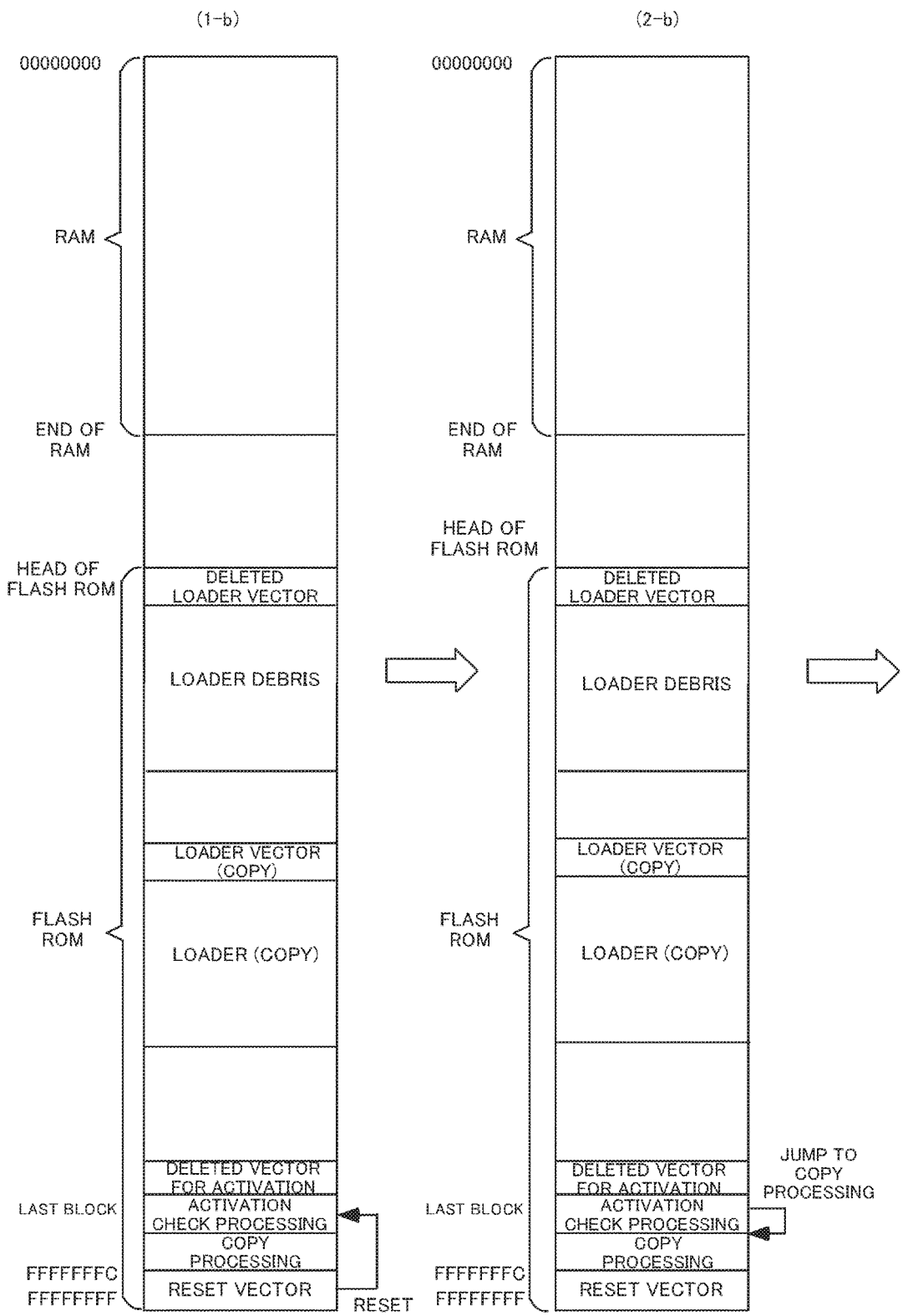
FIG. 10 is a diagram illustrating sequence of recovery firmware update.
Figure 11:
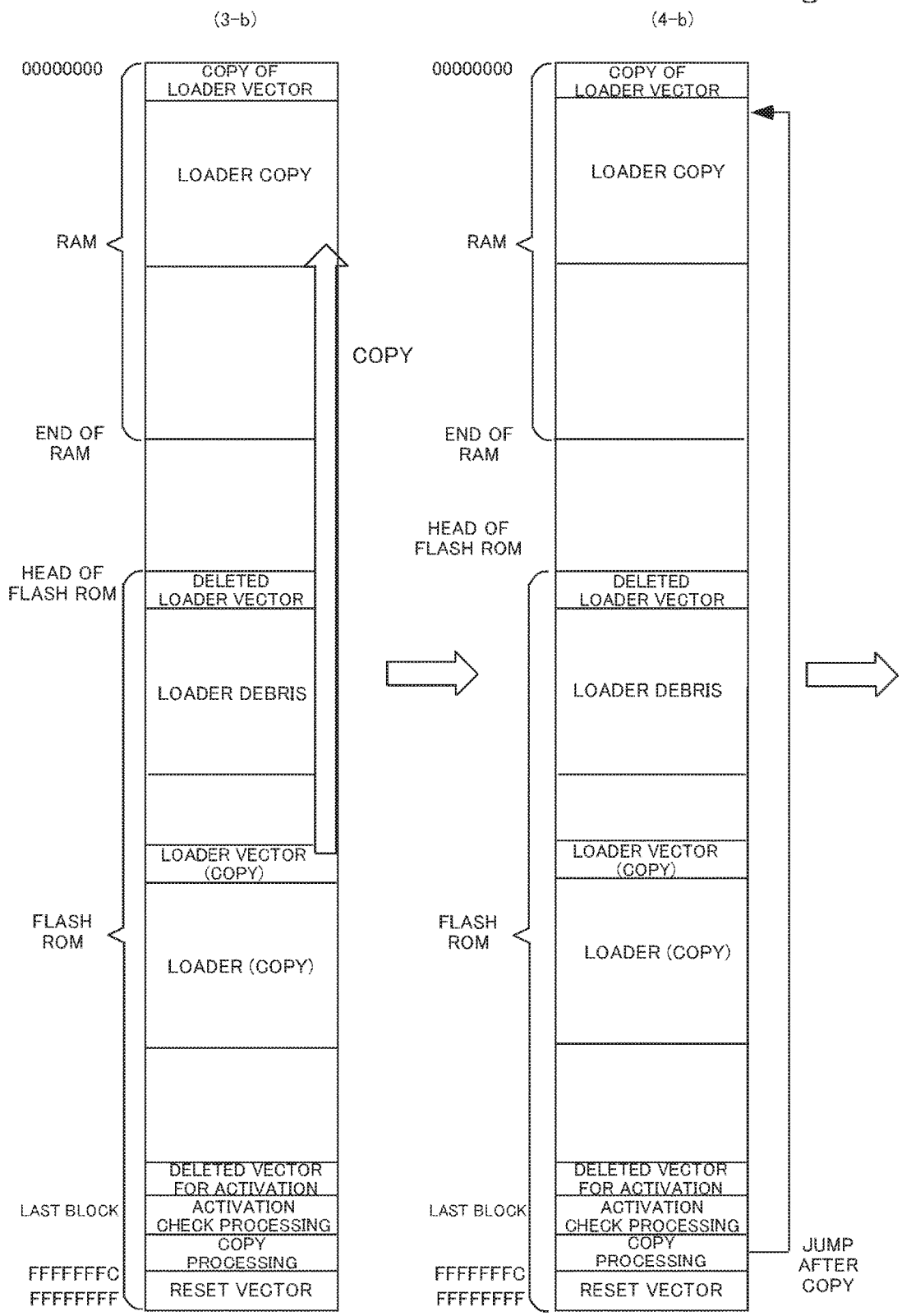
FIG. 11 is a diagram illustrating sequence of recovery firmware update.

(Sequence b of Recovery Update (FIG. 10 and FIG. 11))

(1-b) When the microcomputer 2 is reset, the CPU reads the reset vector, the reset vector indicates the activation check processing, and the CPU jumps to the activation check processing. (2-b) The CPU checks the vector for activation, the vector for activation is deleted, and the CPU jumps to the activation check processing. (3-b) The CPU confirms that the loader vector is not deleted, the loader vector is deleted, and copies the loader vector (copy) and the loader (copy) which are on fixed address to the RAM. (4-b) The CPU jumps to address of the loader which is indicated by the loader vector (the loader vector may be on the flash ROM before copy or after copy) (The loader vector is compiled to indicate address on the RAM.). At this time, the CPU sets flag A←1 and flag B←1 as parameter. Flag A=1 indicates that the vector for activation is deleted. Flag B=1 indicates that the loader vector is deleted. After this, the CPU performs processings of (8) to (12).

Herein, delete of the loader vector corresponds to a mark (second mark) which indicates that the loader is being rewritten. The CPU provides the mark on the flash ROM by deleting the loader vector. When the loader vector is not deleted, the CPU judges that the loader is not being rewritten, namely, rewriting is not interrupted when the loader is being rewritten. When the loader vector is deleted, the CPU judges that the loader is being rewritten, namely, rewriting is interrupted when the loader is being rewritten.

(Activation Check)

Figure 12:
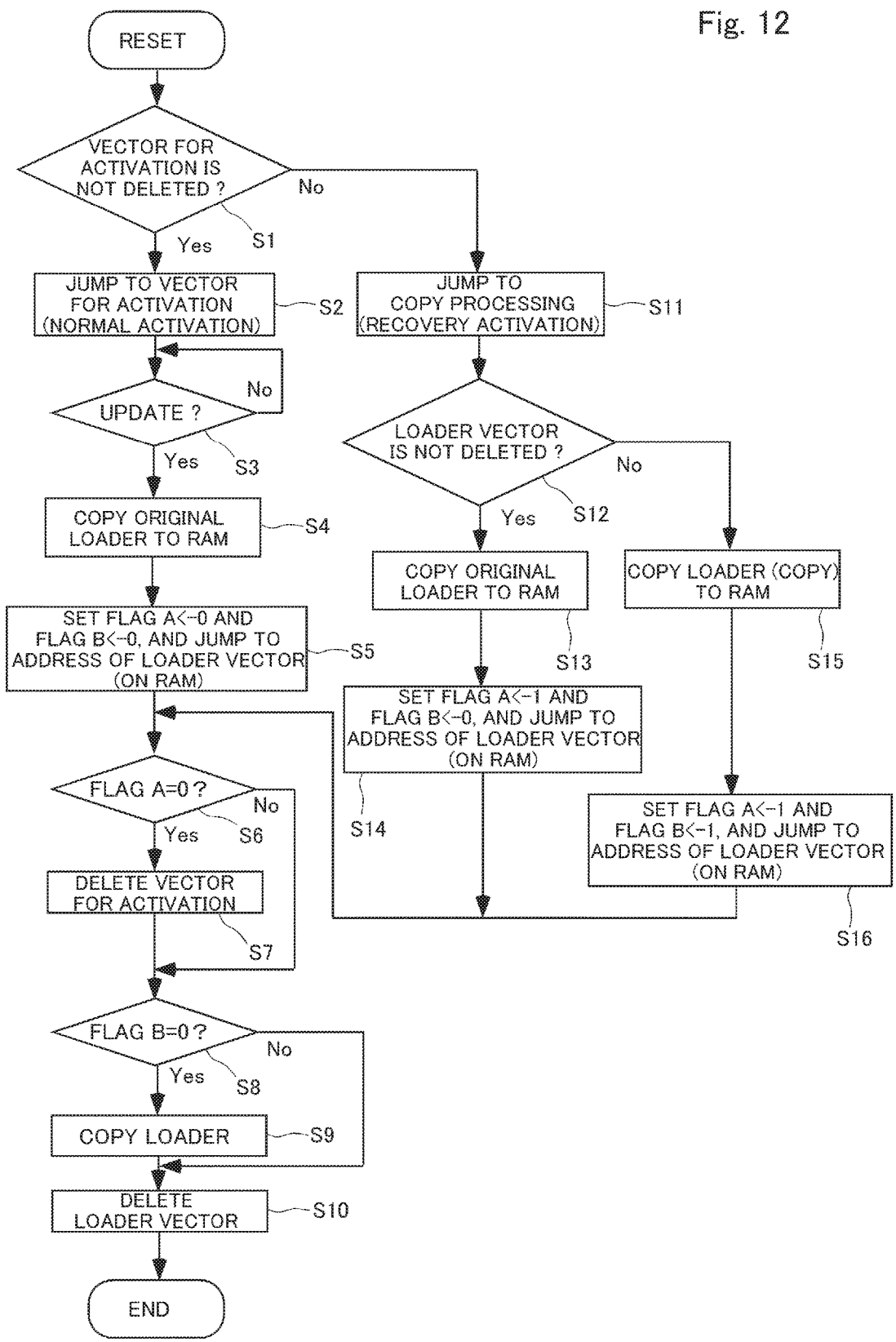
FIG. 12 is a flow chart illustrating processing operation of a speaker device in case where the speaker device performs activation check.
Figure 14:
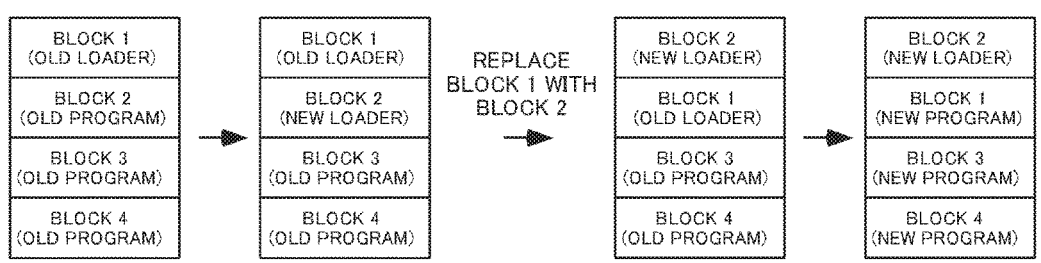
FIG. 14 is a diagram illustrating replacement of blocks.

Processing operation of the speaker device 1 in case where the speaker device 1 performs activation check is described based on the flowchart which is illustrated in FIG. 12 below. First, the CPU judges whether the vector for activation is not deleted or not (S1). When the CPU judges that the vector for activation is not deleted (S1: Yes), it jumps to the vector for activation (S2). In this case, normal activation is performed. Next, the CPU judges whether it performs update of the firmware or not (S3). While the CPU judges that it does not perform update of the firmware (S3: No), it performs processing of S3 repeatedly.

When the CPU judges that it performs update of the firmware (S3: Yes), it copies the original loader to the RAM (S4). Next, the CPU sets flag A←0 and flag B←0 and jumps to address of the loader vector (on the RAM) (S5). Next, the CPU judges whether flag A is 0 or not (S6). When the CPU judges that flag A is 0 (S6: Yes), it deletes the vector for activation (S7). When the CPU judges that flag A is not 0 (S6: No), or after processing of S7, it judges whether flag B is 0 or not (S8). When the CPU judges that flag B is 0 (S8: Yes), it copies the loader (S9). When the CPU judges that flag B is not 0 (S8: No), or after processing of S9, it deletes the loader vector (S10).

When the CPU judges that the vector for activation is deleted (S1: No), it jumps to copy processing (S11). In this case, recovery processing is performed. Next, the CPU judges whether the loader vector is not deleted or not (S12). When the CPU judges that the loader vector is not deleted (S12: Yes), it copies the original loader to the RAM (S13). Next, the CPU sets flag A←1 and flag B←0, and jumps to address of the loader vector (on the RAM). Next, the CPU performs processing of S6.

When the CPU judges that the loader vector is deleted (S12: No), it copies the loader (copy) to the RAM (S15). Next, the CPU sets flag A←1 and B←1 and jumps to address of the loader vector (on the RAM) (S16). Next, the CPU performs processing of S6.

The CPU puts the vector and data illustrated in FIG. 13 on head of the loader (head of flash ROM).

As described above, in the present embodiment, the CPU copies the loader which is stored in the flash ROM to the other position of the flash ROM. Further, when the CPU judges that the loader is being rewritten, namely, rewriting is interrupted when the loader is being rewritten, it copies the loader that is copied to the other position of the flash ROM to the RAM. Thus, the CPU executes the loader which is copied to the RAM, and can rewrite the firmware which is stored in the flash ROM. Like this, according to the present embodiment, the firmware can be recovered even if rewriting is interrupted when the loader is being rewritten.

Further, in the present embodiment, when the CPU copies the loader which is stored in the flash ROM to the other position of the flash ROM, it copies the loader to the position where the firmware body is stored. For this reason, it is not necessary that another flash ROM for copy of the loader is secured.

The embodiment of the present invention is described above, but the mode to which the present invention is applicable is not limited to the above embodiment and can be suitably varied without departing from the scope of the present invention.

In the above described embodiment, as an electronic device which includes the firmware, the speaker device is illustrated. Not limited to this, an electronic device which includes firmware may be applied.

The present invention can be suitably employed in an electronic device which includes firmware.

What is claimed is:

1. An electronic device comprising: a volatile memory; a non-volatile memory which is for storing firmware; and a circuit, wherein the firmware includes a firmware body and a loader which is for rewriting the non-volatile memory, and the circuit provides a first mark which indicates that the firmware is being rewritten on the non-volatile memory, provides a second mark which indicates that the loader is being rewritten on the non-volatile memory, judges whether the firmware is being rewritten or not based on the first mark when activating, copies the loader which is stored in the non-volatile memory to the volatile memory when it judges that the firmware is not being rewritten, copies the loader which is stored in the non-volatile memory to an other position of the non-volatile memory, judges whether the loader is being rewritten or not based on the second mark when it judges that the firmware is being rewritten, copies the loader which is copied to the other position of the non-volatile memory to the volatile memory when it judges that the loader is being rewritten, and executes the loader which is copied to the volatile memory and rewrites the firmware which is stored in the non-volatile memory, and wherein the circuit copies the loader which is stored in the non-volatile memory to the position where the firmware body is stored when it copies the loader which is stored in the non-volatile memory to the other position of the non-volatile memory, rewrites the loader before it rewrites the firmware body, and rewrites the firmware body after it rewrites the loader.

2. The electronic device according to claim 1,
wherein the circuit deletes the first mark after it copies the loader which is stored in the non-volatile memory to the volatile memory.

3. The electronic device according to claim 1,
wherein the first mark corresponds to delete of vector for activation which indicates address of the firmware body, and
the circuit
judges that the firmware is not being rewritten when the vector for activation is not deleted, and
judges that the firmware is being rewritten when the vector for activation is deleted.

4. The electronic device according to claim 1,
wherein the circuit deletes the second mark after it copies the loader which is stored in the non-volatile memory to the other position of the non-volatile memory.

5. The electronic device according to claim 1,
wherein the second mark corresponds to delete of loader vector which indicates address of the loader which is stored in the non-volatile memory, and
the circuit
judges that the loader is not being rewritten when the load vector is not deleted, and
judges that the loader is being rewritten when the load vector is deleted.

6. An electronic device comprising: a volatile memory; a non-volatile memory which is for storing firmware; and a controller, wherein the firmware includes a firmware body and a loader which is for rewriting the non-volatile memory, and the controller provides a first mark which indicates that the firmware is being rewritten on the non-volatile memory, provides a second mark which indicates that the loader is being rewritten on the non-volatile memory, judges whether the firmware is being rewritten or not based on the first mark when activating, copies the loader which is stored in the non-volatile memory to the volatile memory when it judges that the firmware is not being rewritten, copies the loader which is stored in the non-volatile memory to an other position of the non-volatile memory, judges whether the loader is being rewritten or not based on the second mark when it judges that the firmware is being rewritten, copies the loader which is copied to the other position of the non-volatile memory to the volatile memory when it judges that the loader is being rewritten, and executes the loader which is copied to the volatile memory and rewrites the firmware which is stored in the non-volatile memory, and wherein the controller copies the loader which is stored in the non-volatile memory to the position where the firmware body is stored when it copies the loader which is stored in the non-volatile memory to the other position of the non-volatile memory, rewrites the loader before it rewrites the firmware body, and rewrites the firmware body after it rewrites the loader.

* * * * *